United States Patent

Lambert

[15] 3,662,360

[45] May 9, 1972

[54] MAGNETIC INFORMATION DISK EQUIPMENT

[72] Inventor: Stephen Anthony Lambert, Berlin, Mass.

[73] Assignee: Digital Information Storage Corporation, Berlin, Mass.

[22] Filed: June 23, 1970

[21] Appl. No.: 49,069

[52] U.S. Cl. ..................340/174.1 C, 179/100.2 Z, 274/10 R

[51] Int. Cl. ..................G11b 17/04

[58] Field of Search ..................274/10 R, 10 D; 340/174.1 C, 340/174.1 E; 179/100.2 Z

[56] References Cited

UNITED STATES PATENTS

| | | | |
|---|---|---|---|
| 2,243,698 | 5/1941 | Freborg et al. | 274/10 |
| 3,416,150 | 12/1968 | Lindberg, Jr. | 340/174.1 C |
| 3,177,493 | 4/1965 | Durlofsky | 340/174.1 E |
| 3,165,321 | 1/1965 | Osborne et al. | 274/10 D |

*Primary Examiner*—Bernard Konick
*Assistant Examiner*—J. Russell Goudeau
*Attorney*—Martin Kirkpatrick

[57] ABSTRACT

Information storage disk equipment for handling and storing interchangeable disks, including disk loading and rotating mechanism, a disk package and a transfer system. The loading and rotating mechanism has a disk chuck and is movable from a lowered disk release position to a raised position close to the sensing heads. The disk package is releasable and reversibly mounted in the equipment. It consists of an enclosure, an information storage disk having two flat magnetic or other recording surfaces and a disk transport with a central opening surrounding the disk providing free access to each face of the disk. The disk transport and the disk therewithin are slidably mounted within the enclosure for movement to and from it. The disk transfer system moves the disk transport with said disk between a position within the enclosure to the disk release position, with the disk transport remaining at the disk release position while the disk is moved to the raised disk position by the chuck, the disk enclosure remaining in the equipment until the disk transport with said disk are returned by the transfer system. The equipment may also prevent "write" operation of a "read" condition disk, by the provision on the enclosure of a selective condition indicator for each side of the disk.

3 Claims, 20 Drawing Figures

MAGNETIC INFORMATION DISK EQUIPMENT

This invention relates to information disk apparatus and, more particularly, to interchangeable disk apparatus for handling and for loading and unloading a magnetic or other information storage disk from an operating position with respect to read and write devices while protecting the disk surfaces.

Although magnetic or other information storage disk memory systems are widely known and used, it has heretofore proved to be a problem to provide such systems using interchangeable, and, particularly, reversible disks for increased information storage, although such systems were known to be desirable if their inherent problems could be solved.

These problems arise mainly because of the precise with which a disk must be located and rotated with respect to its cooperating read/write head, since, for efficient disk use, close spacing between the tracks of recorded information on the disk must be achieved. Not only must a disk be located in rotation with great precision, it must also be so located closely spaced axially with respect to the heads. Yet, at the same time, contact between the disk surface and head must absolutely be prevented in order to prevent destroying the disk surface and damaging the head.

Too, with interchangeable disks, it is necessary to protect the disk surfaces, not only in operation, but also during movement in and out of operating position and during storage. Because of the fragile mechanical nature of the disk surface, this raises real problems, especially with a reversible disk. Also, from an information standpoint, the inadvertent erasing of the disk surface must be prevented.

Accordingly, it is a major object of the present invention to provide an interchangeable disk handling system capable of mechanically positioning a disk both rotationally and axially with the required precision.

It is another important object of the invention to provide mechanical protection for the disk surfaces, both during transfer and storage.

It is still another object of the invention to prevent inadvertent erasing of the disk information.

Yet another object of the invention is to provide a reversible disk handling system, so that both surfaces of a disk may be used to store information.

Accordingly, the invention, in one major aspect thereof, provides apparatus for handling an information storage disk having at least one flat recording surface. The preferred apparatus comprises a disk rotating mechanism including a stationary housing, disk sensing means mounted in axially but not necessarily radially fixed position at the bottom of the housing, rotatable disk driving means having an air bearing, rotary power means for rotating the disk driving means and linear power means for moving it axially. Disk chucking means may be provided, adapted to engage a central opening of the disk, and is mounted in the housing for vertical movement from a lowered inoperative position, in which the disk may be loaded or unloaded at a distance from the disk sensing means, to a raised operative position in which the disk is locked onto the chucking means and is held at an appropriate distance from the disk sensing means for reading or recording. The rotary power means is preferably adapted to rotate the chucking means before the disk is brought into the operative raised position with respect to the disk sensing means. This arrangement uniquely provides a "fail safe" capability, in that a power or other mechanical failure will result in gravity movement of the disk away from the fixed heads.

In another aspect, the invention provides a novel disk package, preferably reversible, including a protective enclosure with the disk mounted therewithin, together with a disk transport with a central opening surrounding the disk radially therebeyond providing free access to each surface of the disk, the disk transport and disk therewithin being slidably mounted within the enclosure for movement thereof to and from the enclosure.

Still further aspects of the invention are directed to the combination of the disk handling apparatus and the disk package with a disk transfer system. The transfer system moves the disk transport with the disk from its enclosure, bringing the disk into an inoperative position in which the disk chucking means can engage the disk to move it into the operative position. The transport means remains in the position in which it is when the disk is moved away from it by the chucking means. After operation of the disk, it is moved by the chucking means to its inoperative position and is then returned, with its disk transport, by the transfer means to its enclosure.

The disk handling apparatus of the invention also preferably has a selective read/write capability, provided by selective read/write condition sensing means, responsive to a condition indicating means provided by the disk package, permitting writing on a disk surface only when specially set, and otherwise preventing inadvertent writing while permitting reading only.

Other objects, features and advantages will appear from the following description of a preferred embodiment of the invention, taken together with the attached drawings thereof, in which.

GENERAL

Figure 1:
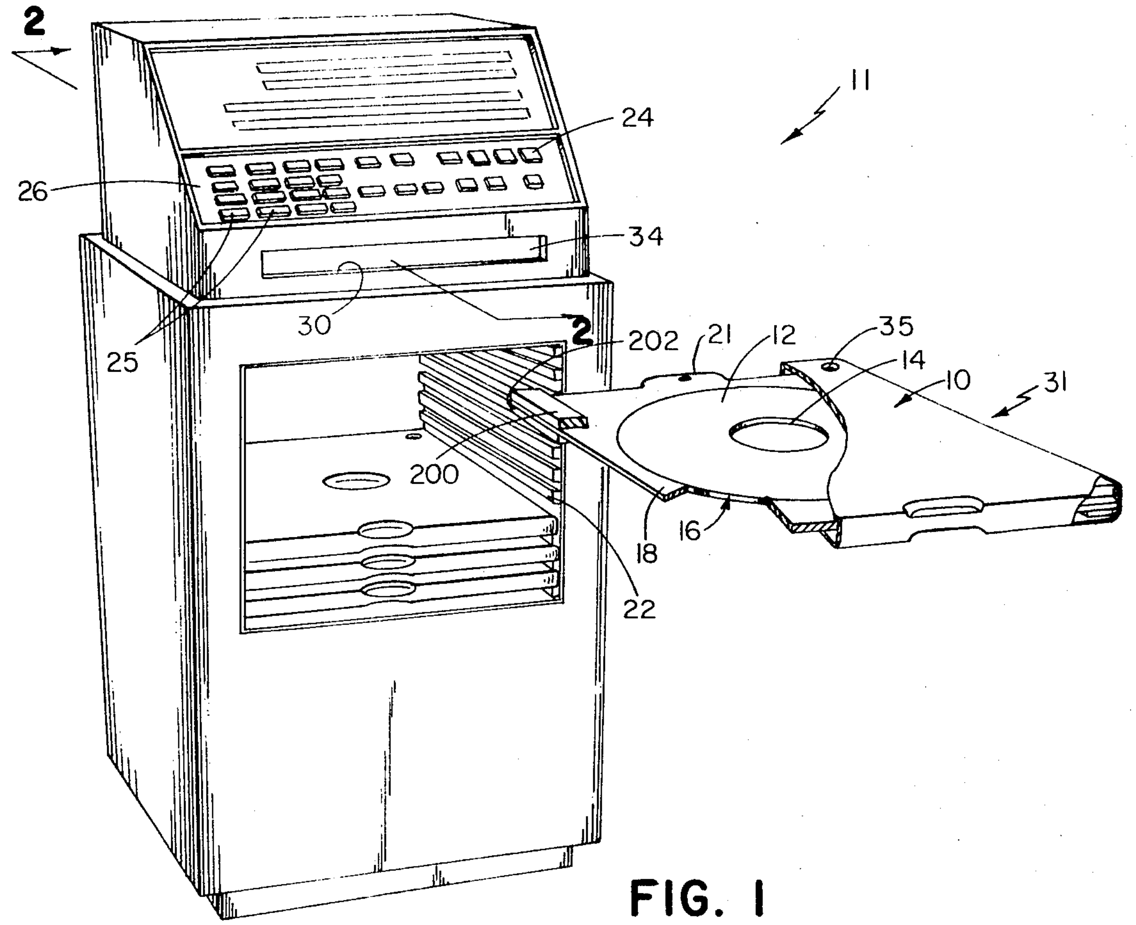
FIG. 1 is an overall perspective view of the interchangeable information storage disk handling apparatus of the invention.

Referring to the drawings, FIG. 1 shows a perspective view of the exterior of the interchangeable information storage disk handling apparatus of the invention, including its enclosed frame 11. Control buttons 24 and indicator lights 25 are located on front panel 26 of frame 11.

Figure 2:
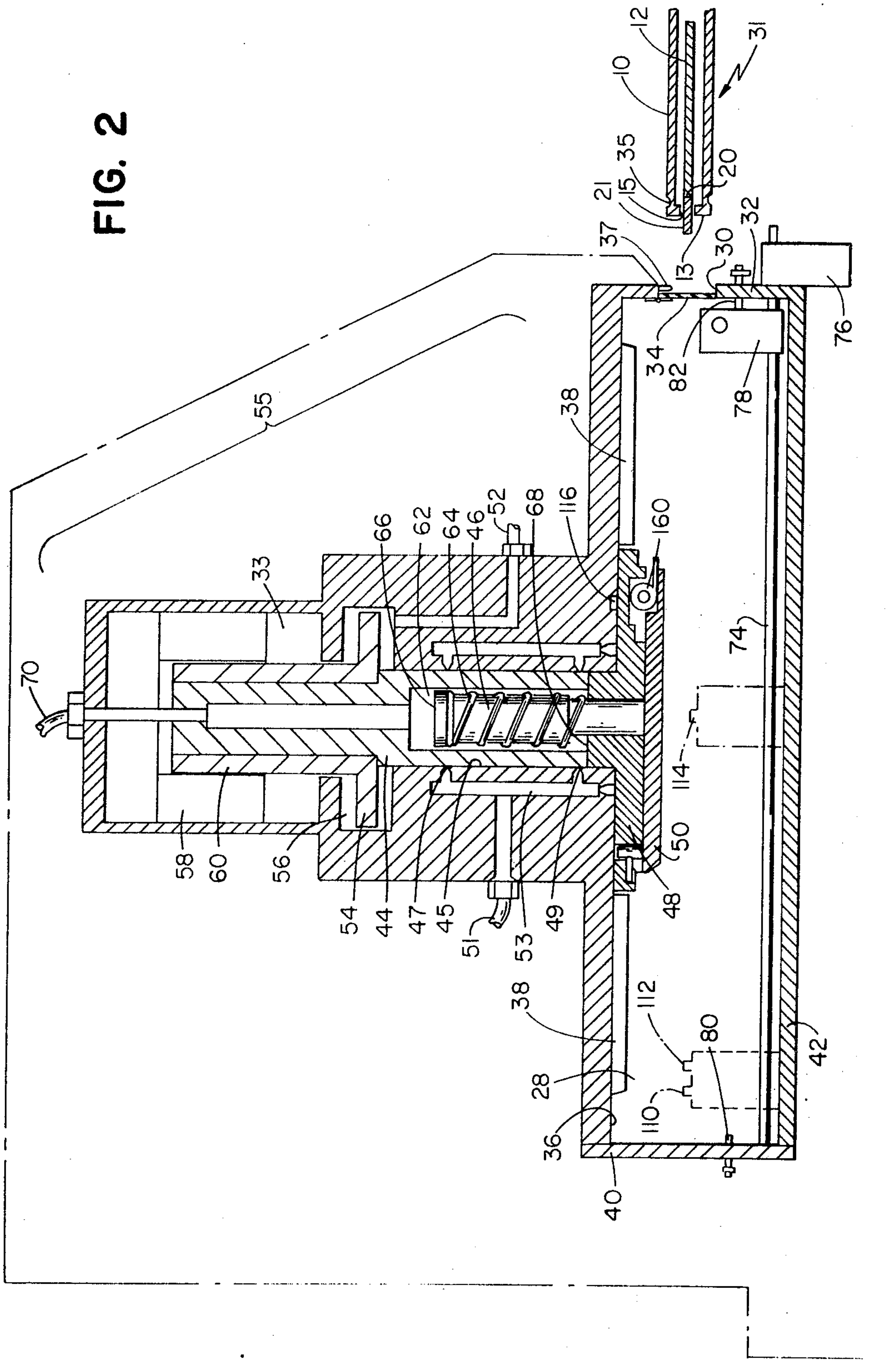
FIG. 2 is a detailed cross-sectional view of the apparatus of FIG. 1 taken on line 2—2 thereof and showing the disk loading and rotating mechanism, a portion of the disk package, and the transfer mechanism for moving the disk therebetween.
Figure 11:
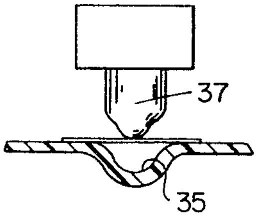
FIG. 11 is a cross section of the selective read/write condition sensing means and condition indicating means.
Figure 20:
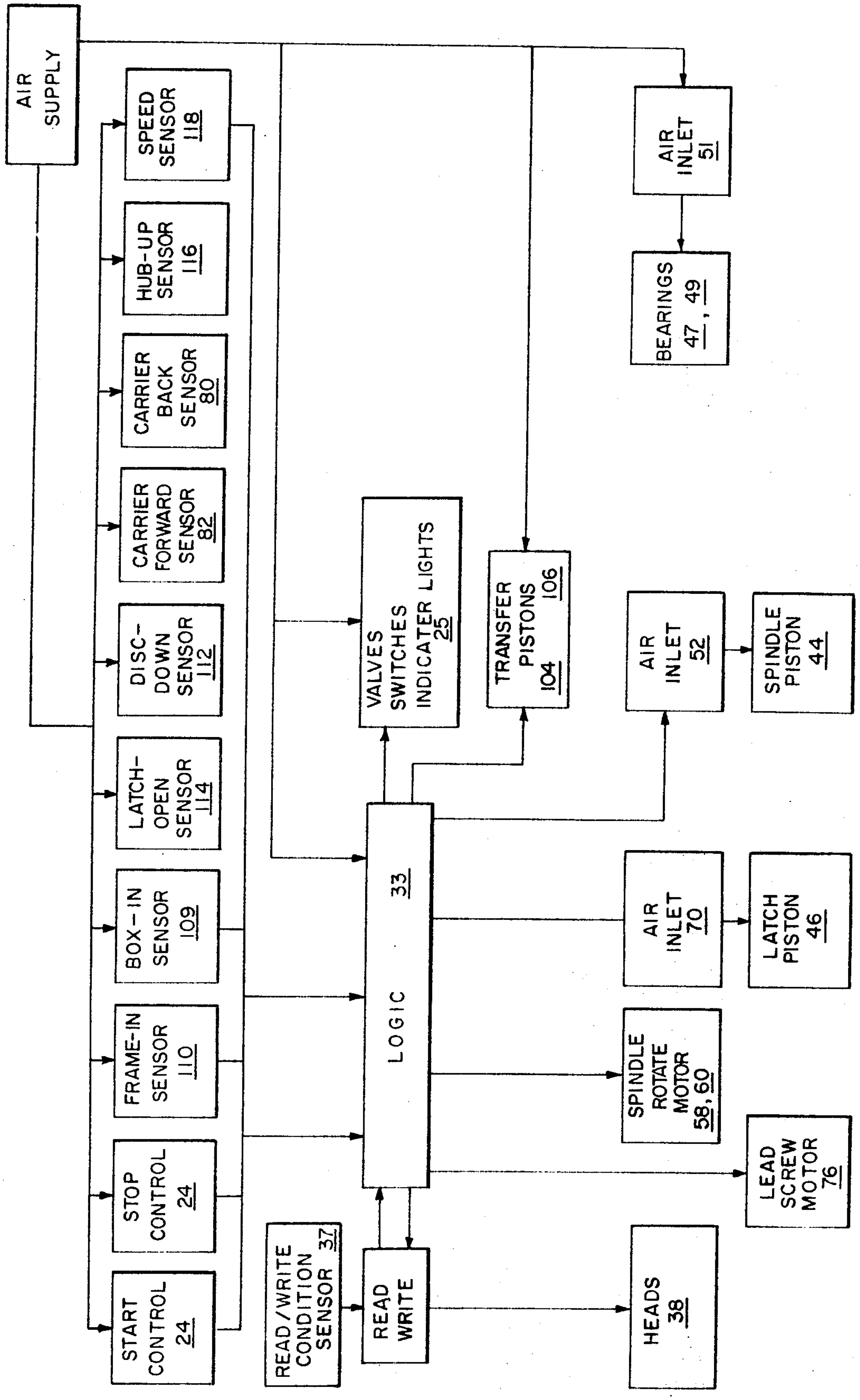
FIG. 20 is a schematic representation of the control elements of the apparatus.

Within frame 11 is provided a pollution-free chamber 28, shown in more detail in FIG. 2, into which a magnetic or other information storage disk 12 is inserted for reading or writing on the disk by read/record heads at 38. Above chamber 28 is a housing generally designated 55 containing the disk loading and rotating mechanism which receives a disk, locks it into place on a hub, rotates it at a suitable speed and raises it into operative position with respect to read/record heads 38. Both radial and thrust air bearings are developed to maintain disk 12 precisely in its desired running position. When the transfer of information has been completed, by either reading or writing as determined by a condition sensor 37 (FIG. 11), the same mechanism lowers the disk, brakes to a stop, and releases the disk from the hub for removal from the chamber. The apparatus preferably employs air bearings, air powered pistons, and electric-fluidic switches throughout. A single air supply, shown schematically in FIG. 20, provides pressurized air for the air bearing system, the fluidic logic, and the pneumatically operated elements.

It is preferred that a disk package 31 be provided, wherein disk 12 is stored in protective enclosure 10, within a disk transport 18. To use the disk, package 31 is inserted a short distance into frame 11 at aperture 30, and a disk transfer mechanism, including a carrier 78, engages disk transport 18 to draw it, and thereby disk 12, into chamber 28 where it is loaded onto the hub. The same carrier removes disk 12 from the chamber after use, and replaces it within enclosure 10, so that the disk package 31 can be removed for storage. Other similar packages including similar disks are stored on runners 22 within the lower part of frame 11 for easy access.

DISK LOADING AND ROTATING MECHANISM

This mechanism, designated generally as 55, includes elements for raising and lowering a disk into operative position, and means for rotating the disk while it is in operative position.

Above chamber 28, in housing 55, is the assembly for raising and lowering a disk into position for reading or recording. Extending into chamber 28 above the central area thereof are two concentric spindles 44 and 46, terminating within chamber 28 in two generally flat generally circular plates 48 and 50 respectively, independently reciprocable along and rotatable around their common axis. Logic circuitry to control operation of the machine is provided on cards stacked at 33, surrounding spindle 60.

Figure 7:
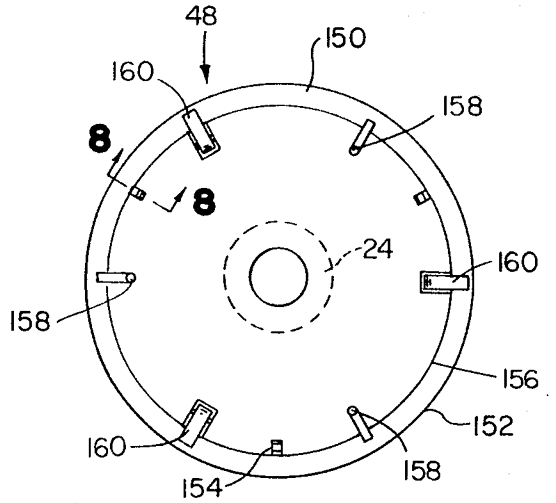
FIGS. 6 and 7 are respectively, cross section and end views of another portion of the disk chucking element of the transfer mechanism of FIG. 2.
Figure 6:
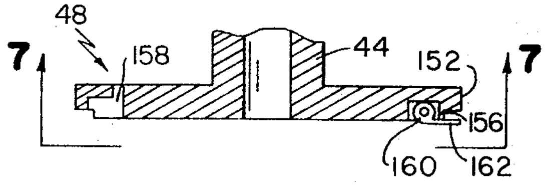
Figure 8:
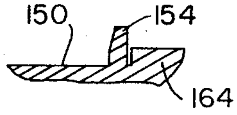
FIG. 8 is a detailed cross-sectional view of a portion of the disk chucking element of FIG. 7 taken on line 8—8 thereof.

Outer spindle 44 is the disk rotating spindle. Disk supporting plate or hub 48 at the end of spindle 44 accepts the disk and retains it in operating position. Referring now to FIGS. 6, 7 and 8, hub 48 provides a disk-retaining surface 150 cut into its outer edge 152, and three positioning bosses 154 equally spaced around inner edge 156, bosses 154 being beveled outwardly toward surface 150 to permit the inner edge 14 of disk 12 to slide past bosses 154 wh disc 12 is placed on the hub. Further, hub 48 has three pin receiving holes 158 and three latch fingers 160 with ends 162 that extend beyond edge 156 to overlap inner edge 14 of disk 12 when it is in place on the hub.

Figure 5:
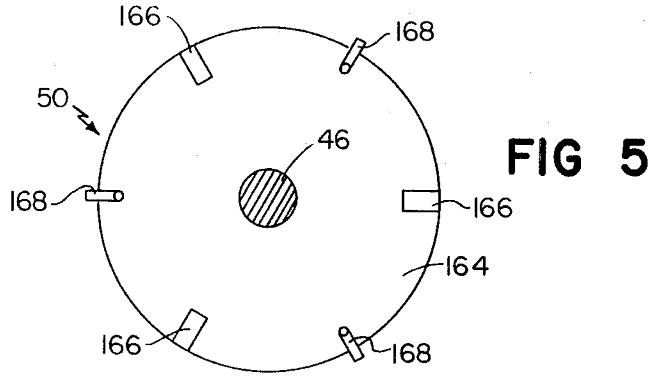
FIGS. 4 and 5 are, respectively, cross section and end views of a portion of the disk chucking element of the transfer mechanism of FIG. 2.
Figure 4:
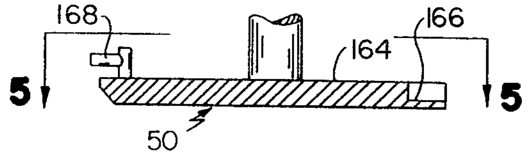

Latch-operating plate 50 by moving up or down with respect to hub 48 locks and releases latch fingers 160 to retain disk 12 in place on hub 48. Referring now to FIGS. 4 and 5, on the upper surface 164 of plate 50 are three latch spaces 166, equally spaced around the perimeter of plate 50. A disk removal pin 168 is located diametrically opposite each space 166, and is adapted to fit into a pin receiving hole 158 on plate 48 when plates 48 and 50 are brought together to close latches 160.

Spindle 44 is rotated by a hysteresis synchronous electric motor, with stator at 58 add rotor consisting of a permanent magnet at 60.

Hub spindle 44 rotates within cylindrical journal 45, and is lubricated by air bearings. Referring to FIG. 2, air under pressure is supplied through air inlet 51 to the cylindrical air space 53, surrounding journal 45, and from air space 53 the air is forced into a number of outlets 47, disposed in a circular pattern around spindle 44, and similar outlets 49 disposed in a similar circular pattern below outlets 47.

Figure 15:
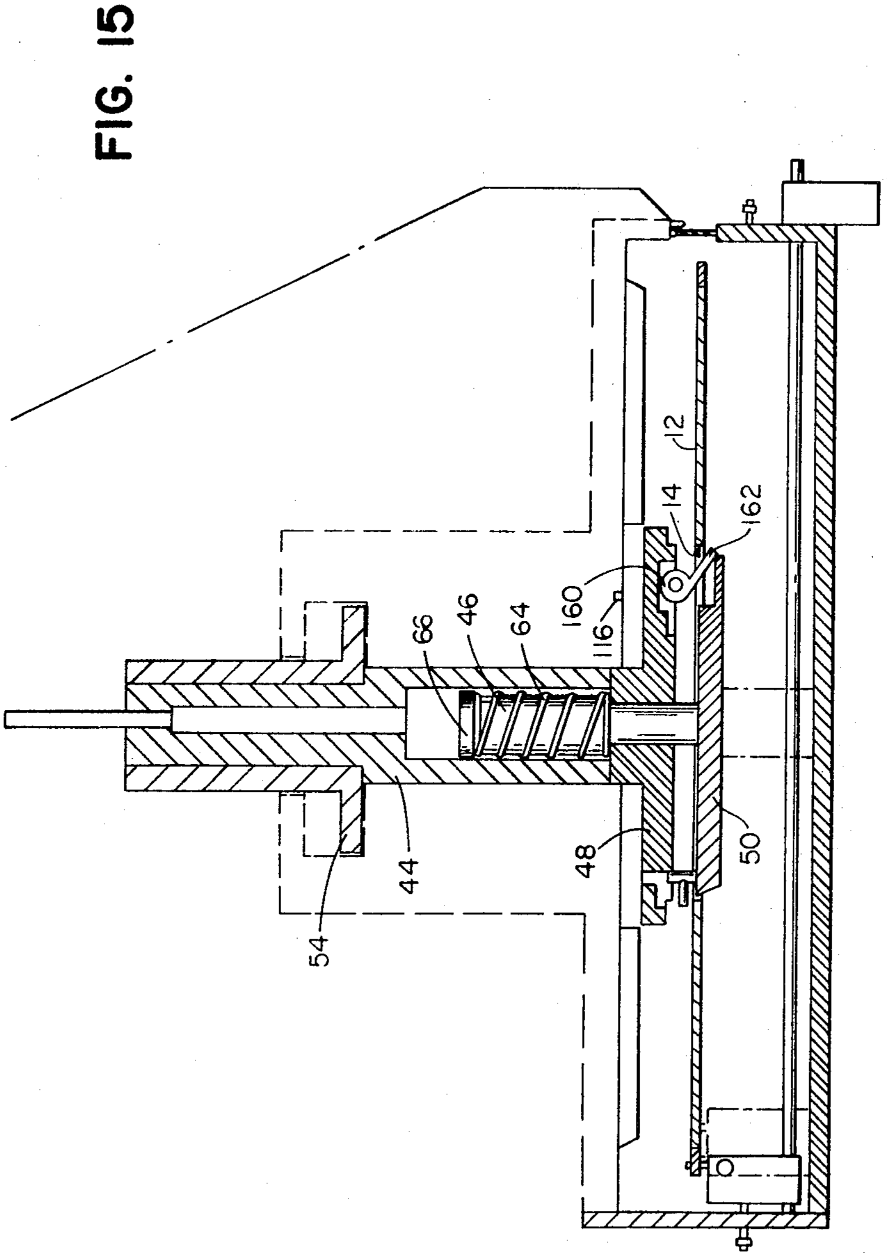

The rest or non-operating position of outer spindle 44 is its lowest position, as shown for example in FIG. 15. Therefore, in case of a power failure, the disk will come to rest out of contact with the read/record heads, thus preventing damage to the disk. To raise spindle 44, air under pressure is supplied through port 52; flange 54 acts as a piston and reciprocates within chamber 56.

Inner spindle 46 is the latch-operating spindle, and reciprocates axially within chamber 62. A spring 64 is confined between upper end 66 of spindle 46 and lower wall 68 of chamber 62, surrounding spindle 46 and biasing it upwardly within chamber 62. To lower spindle 46 against the force of spring 64, air under pressure is supplied through air passage 70.

The disk loading and rotating mechanism handles the disk in the protected environment of a pollution-controlled chamber 28, shown in FIG. 2, and defined by front wall 32, upper wall or deck 36, side walls 107, rear wall 40 and bottom 42. Read/record heads 38 are suspended, usually by springs, in generally axially fixed position, from deck 36 over an annular area to correspond with a face of disk 12. They may be either fixed or movable in the plane of the disk, as for radial movement. These details of such heads and disks are well known whether they operate on magnetic, optical or other principles and need not be further described herein. Front wall 32 provides an access opening 30 for admitting disk package 31, normally closed by a dust-excluding flap 34, hinged to open inwardly. Adjacent to an access opening 30 is a read/write condition sensor 37.

Figure 3:
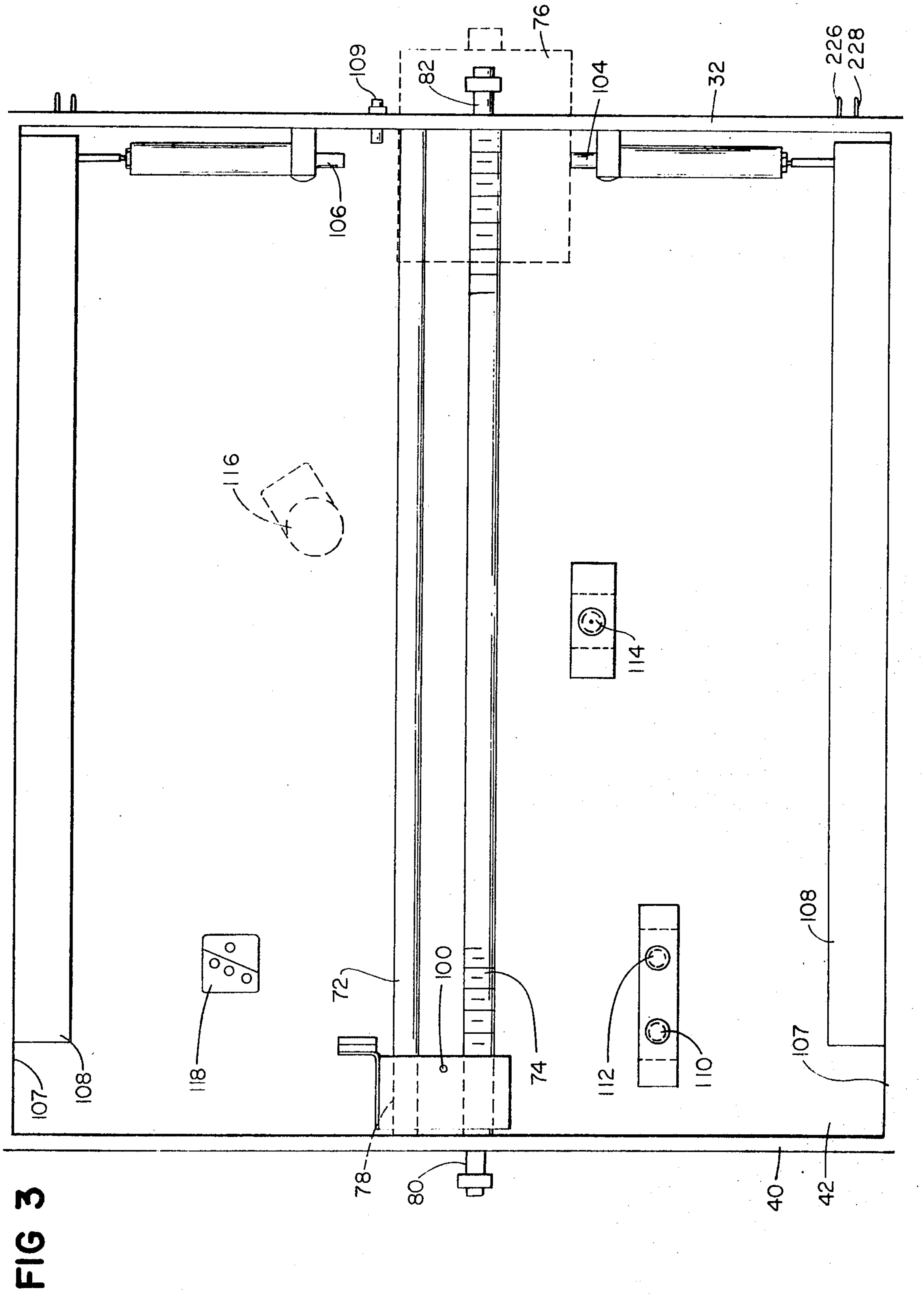
FIG. 3 is a plan view of the transfer mechanism portion of the apparatus shown in FIG. 2.

Within chamber 28, referring now to FIG. 3, are two guide tracks 108 supported on side walls 107 at a height suitable to receive and support the edges of disk 12 as it enters chamber 28. Transport sensor 110, disk-back-and-down sensor 112, latch-open sensor 114, and speed sensor 118 are all supported on floor 42 of chamber 28, and hub-up sensor 116 is attached to deck 36. Information is supplied by these sensors to the control logic at 33. The interior of chamber 28 is maintained at a pressure slightly greater than that of the atmosphere; as a result, when flap 34 is opened to permit entrance of the disk, air flows outward, helping to keep the interior of the chamber free of dust or other contaminants.

DISK PACKAGE AND TRANSFER MECHANISM

Figure 18:
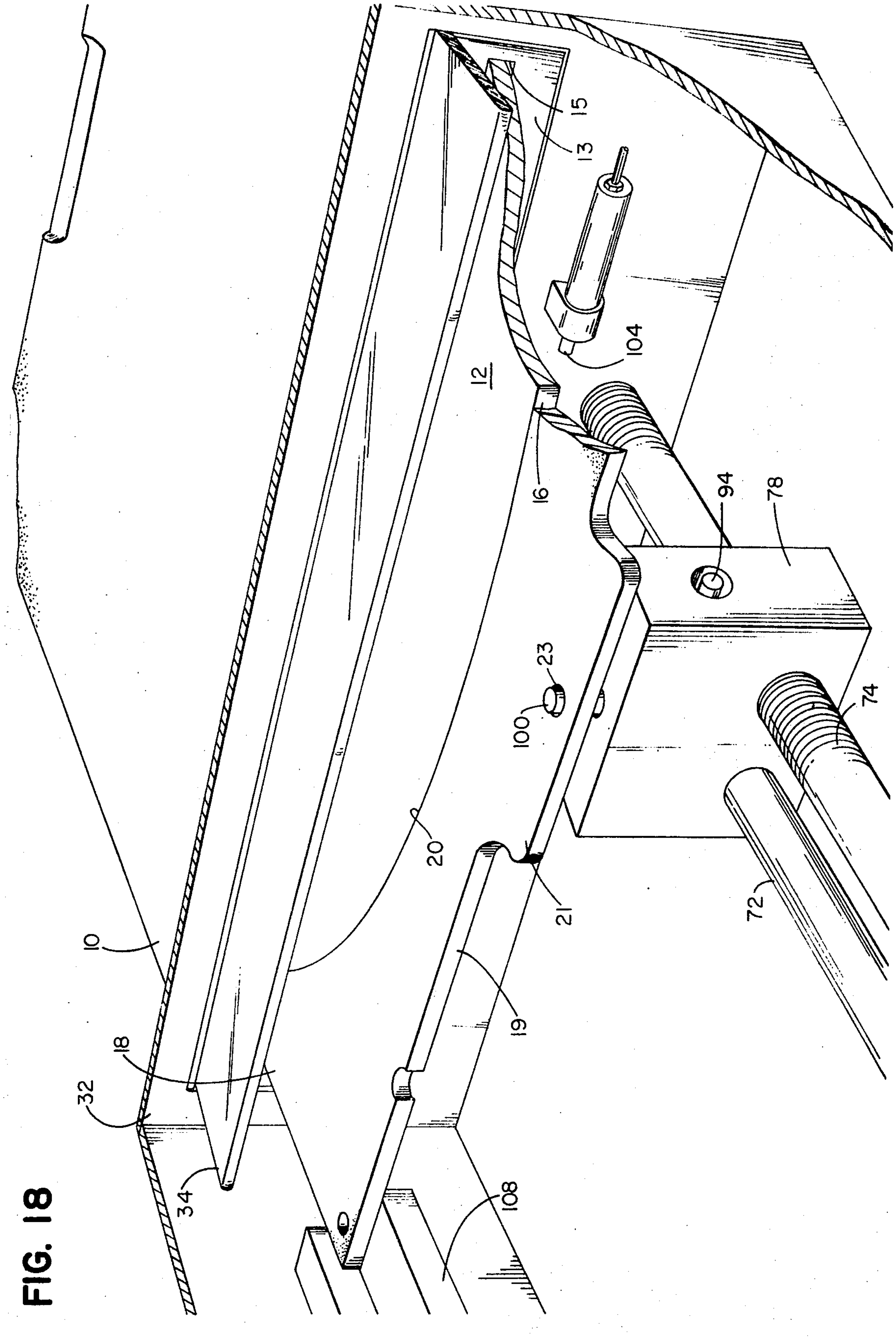
FIGS. 18 and 19 are detailed perspective views partially broken away of the transfer mechanism and disk package including the disk transport.

Disk 12, together with transport frame 18 and protective enclosure 10, form disk package 31. Enclosure 10 has an end access opening 15 (shown in FIG. 18) of just sufficient size to permit transport 18, with disk 12, to slide therethrough. Each side of enclosure 10 has a read/write condition indicator 35 cooperating with the read/write condition sensor 37 on frame 11. The indicator and sensor are so designed as normally to prevent writing, while permitting reading, of a disk face.

Disk 12 provides flat annular recording surfaces, and has a circular inner edge 14 and a circular outer edge 16. A generally rectangular transport 18 of the thickness of disk 12 provides a central circular opening 20, of the diameter of disk 12, within which disk 12 is placed allowing access to both faces of the disk for reading or recording without requiring alteration of the position of the disk within the transport or enclosure. Both disk and transport are supported within enclosure 10 by pairs of wood tracks, described below.

Leading edge 19 of transport 18 provides a latch handle 21 with a latch pin hole 23. When disk and transport are in storage position within the enclosure, leading edge 18 extends into aperture 15 and substantially closes it against dust or other contaminants, while latch handle 21 extends beyond face 13 and remains exterior to enclosure 10. A removable sealing cap, not shown, is provided for use when the enclosure is stored, to cover face 13 while completely enclosing aperture 15 and frame 18.

Figure 19:
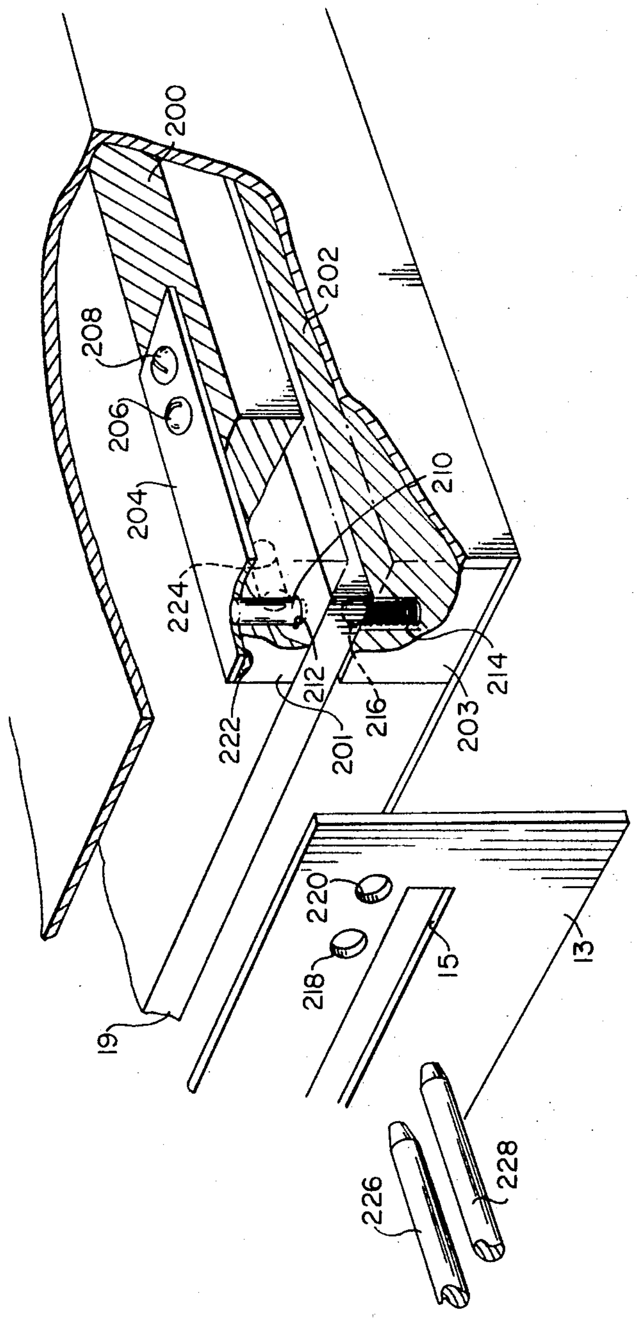

Transport 18 is locked into enclosure 10 to ensure that it, and therefore disk 12 seated within it, can be removed only when enclosure 10 is inserted into frame 11. The disk and its transport 18 are supported within enclosure 10 and spaced away from its flat sides 27 and 29 by wood tracks 200, 202, 205 and 207. Each of tracks 200 and 205 is separated from a paired track 202 or 207 respectively by a distance adapted to permit the transport and disk to slide freely but without play between the tracks. All the tracks are of width adapted to overlap the outer margin of the disk seated within its transport 18, and thus to support disk 12 within enclosure 10. Referring to FIG. 19, tracks 200 and 202 have outer faces 201 and 203 at face 13 of enclosure 10. A flat spring 204 is secured to track 200 by screws 206 and 208, and carries at its free end a lock pin 210 that extends through track 200.

A lock pin receiving hole 212 extends through transport 18, so placed that when transport 18 is in place within the enclosure 10, lock pin 210 extends into hole 212 and serves to lock transport 18 into the enclosure. A helical spring 214, supporting a ball 216, is supported by track 202 and is so placed as to extend part way into lock pin hole 212 on the side of frame 18 opposite lock pin 210. This spring and ball help maintain transport 18 in fixed orientation within enclosure 10.

Front face 13 of enclosure 10 provides two cylindrical holes 218 and 220, and face 201 of track 200 provides two corresponding holes 222 and 224 that are generally cylindrical but are normally narrowed by spring 204. Two generally cylindrical unlocking pins 226 and 228 on frame 11 are so placed that when enclosure 10 is inserted into aperture 30, pins 226 and 228 pass through cylindrical holes 218 and 220 respectively in front face 13 of enclosure 10, and then enter holes 222 and 224 in face 201 of track 200, thereby forcing spring 204 upward and removing lock pin 210 from lock pin hole 212 in transport 18, which is thus freed for motion out of enclosure 10.

A similar combination of spring, ball, lock pin and holes is located in the pair of tracks 205 and 207, diametrically opposite to the mechanism described. A similar pair of unlocking pins is located on frame 11 diametrically opposite pins 226 and 228 shown in FIG. 19. Thus enclosure 10 may be inserted into frame 11 with either face upward, and the unlocking mechanism will release transport 18 for transfer into chamber 28.

Figure 9:
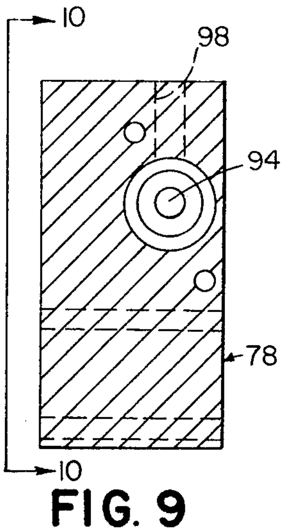
FIGS. 9 and 10 are detailed cross sections of the elements of the transfer mechanism shown in FIGS. 2 and 3.
Figure 10:
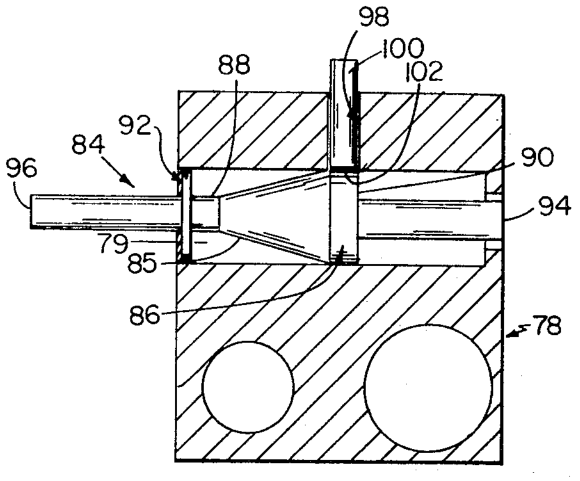

For use, a disk may be taken into chamber 28 from enclosure 10 and replaced into enclosure 10 either by hand or, preferably, automatically by a transfer assembly. Referring to FIG. 3, extending from front wall 32 to rear wall 40 are a tubular guide track 72 and a lead screw 74, turned by a motor 76. A transfer carrier 78, shown in detail in FIGS. 9 and 10, is supported by and is moved along the guide track 72 by the turning of lead screw 74. The two extreme positions of transfer carrier 78 are sensed by carrier-back sensor 80 on rear wall 40 and by carrier-forward sensor 82 on front wall 32. Within transfer carrier 78 is a cam chamber 79, within which a cam 84 extends generally parallel to front wall 32 of chamber 28, having a cylindrical upper pin-support surface 86, a cylindrical lower pin-support surface 88, an inclined surface 85 connecting surfaces 86 and 88, two stop surfaces 90 and 92, and two ends 94 and 96. Carrier 78 has a vertical bore 98 above cam chamber 79; within the bore slides a latch pin 100, whose lower end 102 rests on cam 84. Two air-actuated pistons 104 and 106 are located on front wall 32. When transfer carrier 78 is in the forward position, piston 104 can engage cam end 94 to move it into the latch position, in which end 102 rests on upper support surface 86. Piston 106 can engage cam end 96 to move it into the unlatch position; as cam 84 moves, end 102 of pin 100 slides downward along surface 85 of the cam, and comes to rest against lower support surface 88. Pin 100 is thereby disengaged from latch pin hole 21.

OPERATION

Figure 12:
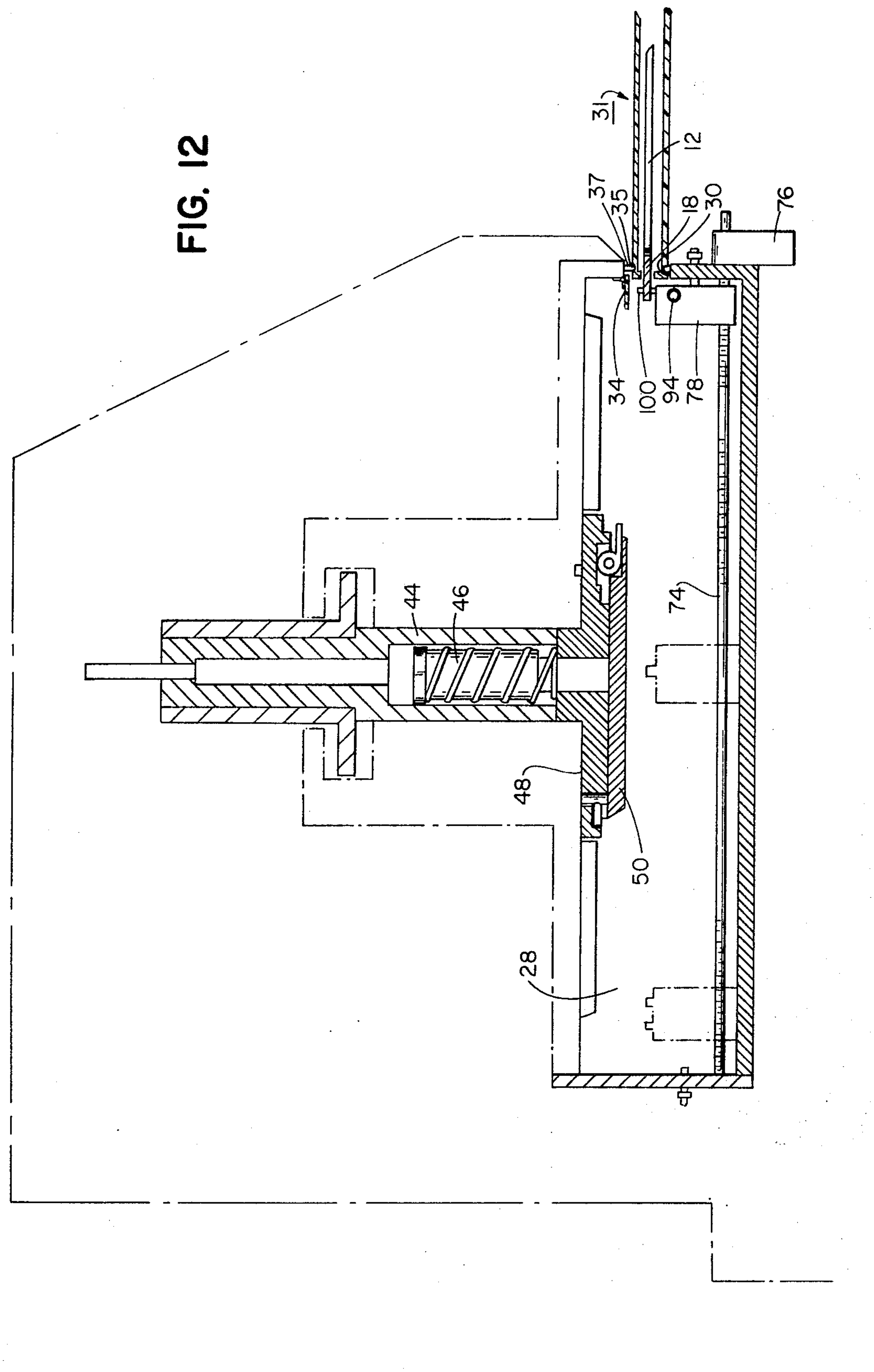
FIGS. 12,13,14,15,16 and 17 are simplified cross-sectional views similar to that of FIG. 2 showing successive stages in the operation of the mechanism.

Referring to FIGS. 12, 13, 14, 15, 16, 17 and 20, and particularly now to FIG. 12, when disk package 31 is inserted into aperture 30, it opens flap 34, and is locked into place. Enclosure 10 actuates enclosure-present sensor 109, and read/write condition sensor 37 senses the state of indicator 35 for the disk face to be used. Transport 18 is released for motion out of enclosure 10 as previously described. Spindles 44 and 46 are already in their raised positions, holding hub 48 and latch plate 50 out of the way of the moving disk and transport, and transfer carrier 78 is forward within chamber 28. In response to the "enclosure present" signal, latch piston 104 is actuated and engages end 94 of cam 84 within carrier 78, moving it to the latch position and thereby raising latch pin 100. Pin 100 engages latch pin hole 23 in handle 21 of transport 18. Motor 76 then turns lead screw 74, moving transfer carrier 78 backward through chamber 28, drawing after it transport 18 with disk 12. Transport and disk are supported on guide track 108.

Figure 13:
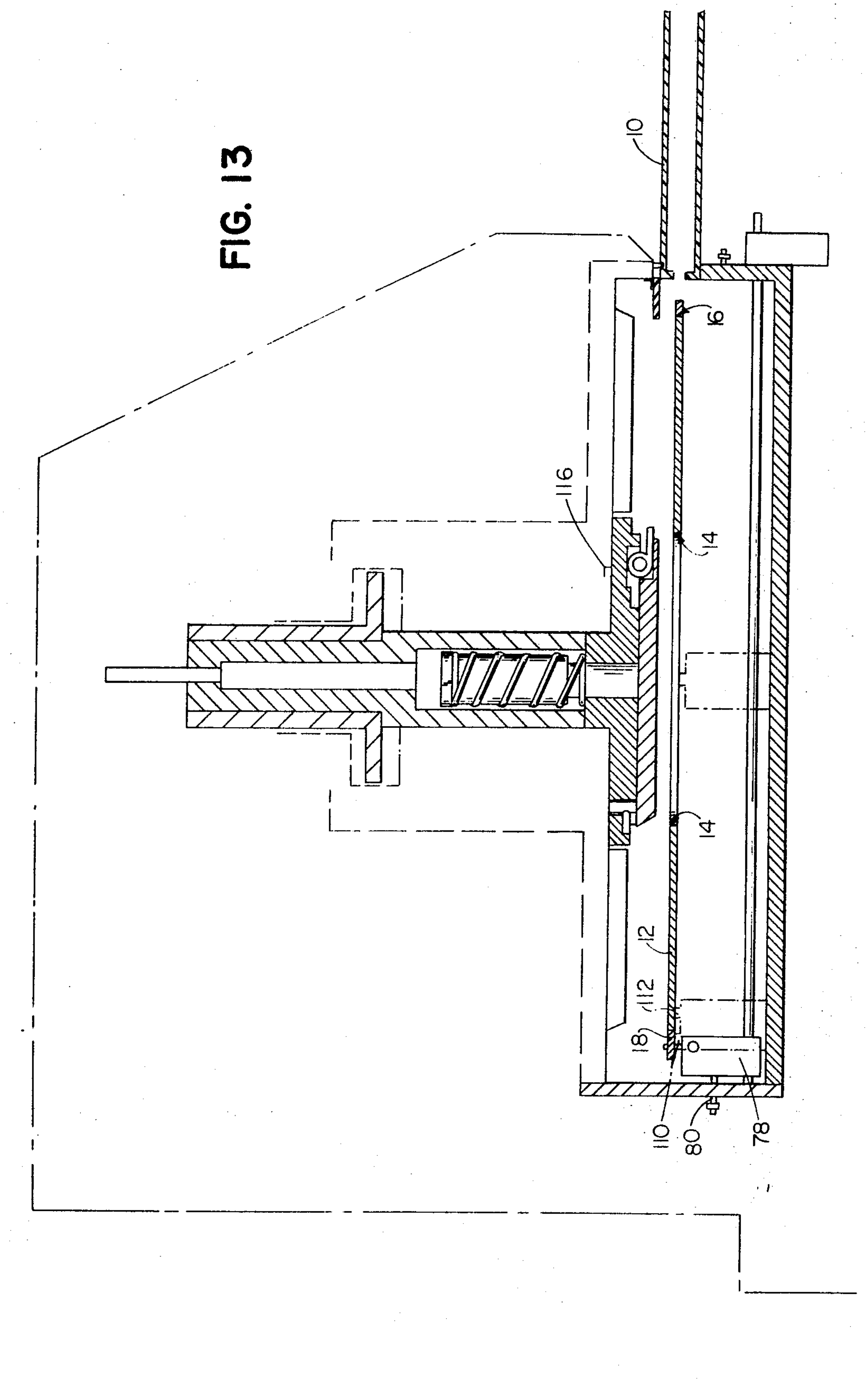

Referring now particularly to FIG. 13, when transfer carrier 78 reaches its extreme back position, it actuates carrier-back sensor 80. Enclosure 10 is unlocked and may be removed from frame 11. Transport 18 is now sensed by the transport sensor 110, and the presence of disk 12 is sensed by sensor 112.

At this point, the operator may command either "Remove disk" by inserting the enclosure, or "Start" by pushing an appropriate button 24. If no enclosure is sensed by sensor 109, and "Start" has been commanded, the loading mechanism is actuated to raise the disk into operating position.

Figure 14:
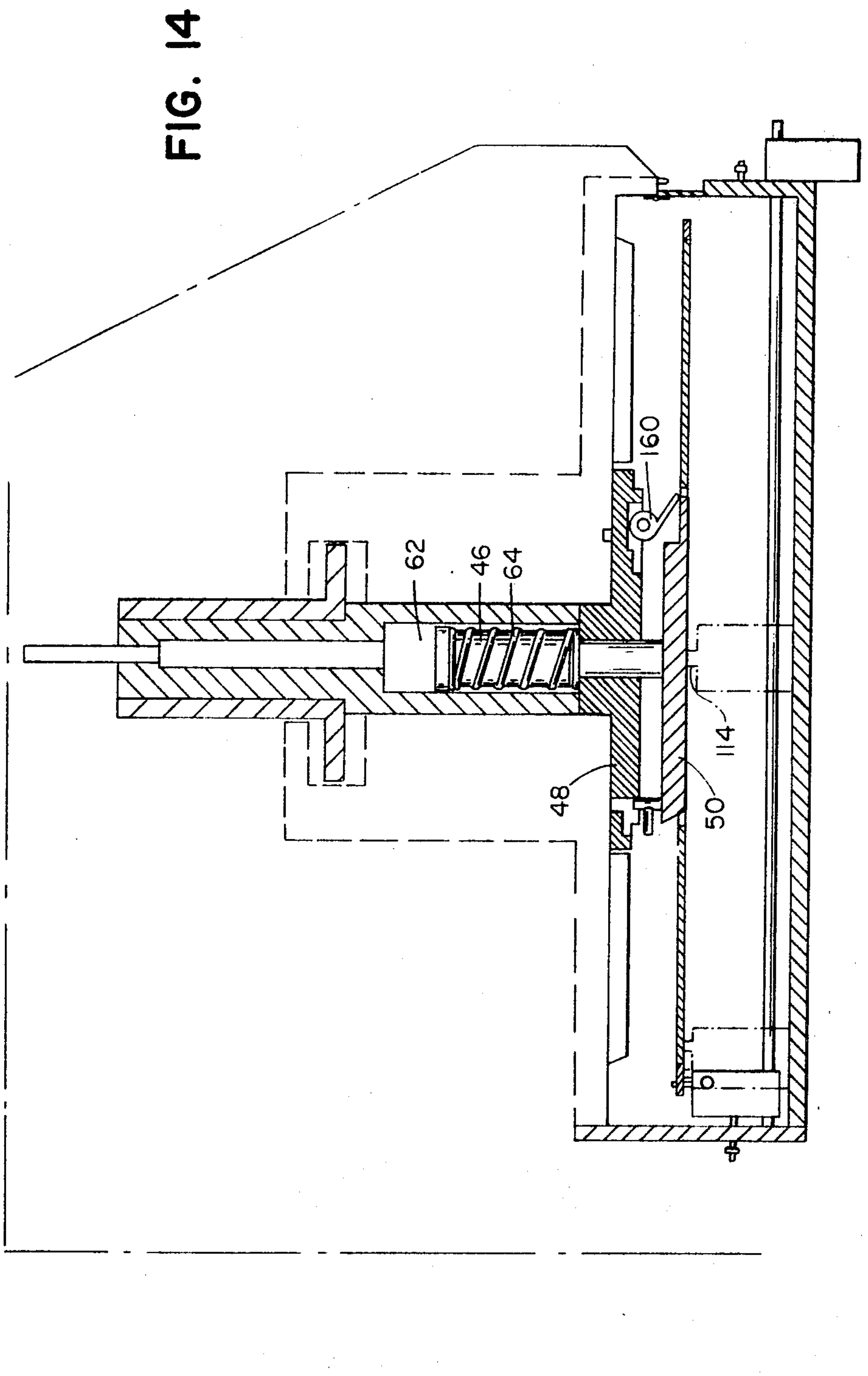

Referring now to FIG. 14, air under pressure is supplied to chamber 62, forcing spindle 46 downward against the force of spring 64. Latch-operating plate 50 is thereby lowered, releasing latch fingers 160 on hub 48. When plate 50 actuates latch-open sensor 114, referring now to FIG. 15, hub spindle 44 is lowered by releasing the air pressure on flange 54, carrying with it spindle 46 and latch plate 50 in lowered position, so that the retracted latch fingers 160 move through the central opening of disk 12, and ends 162 of the latch fingers are brought below inner edge 14 of the disk.

Figure 16:
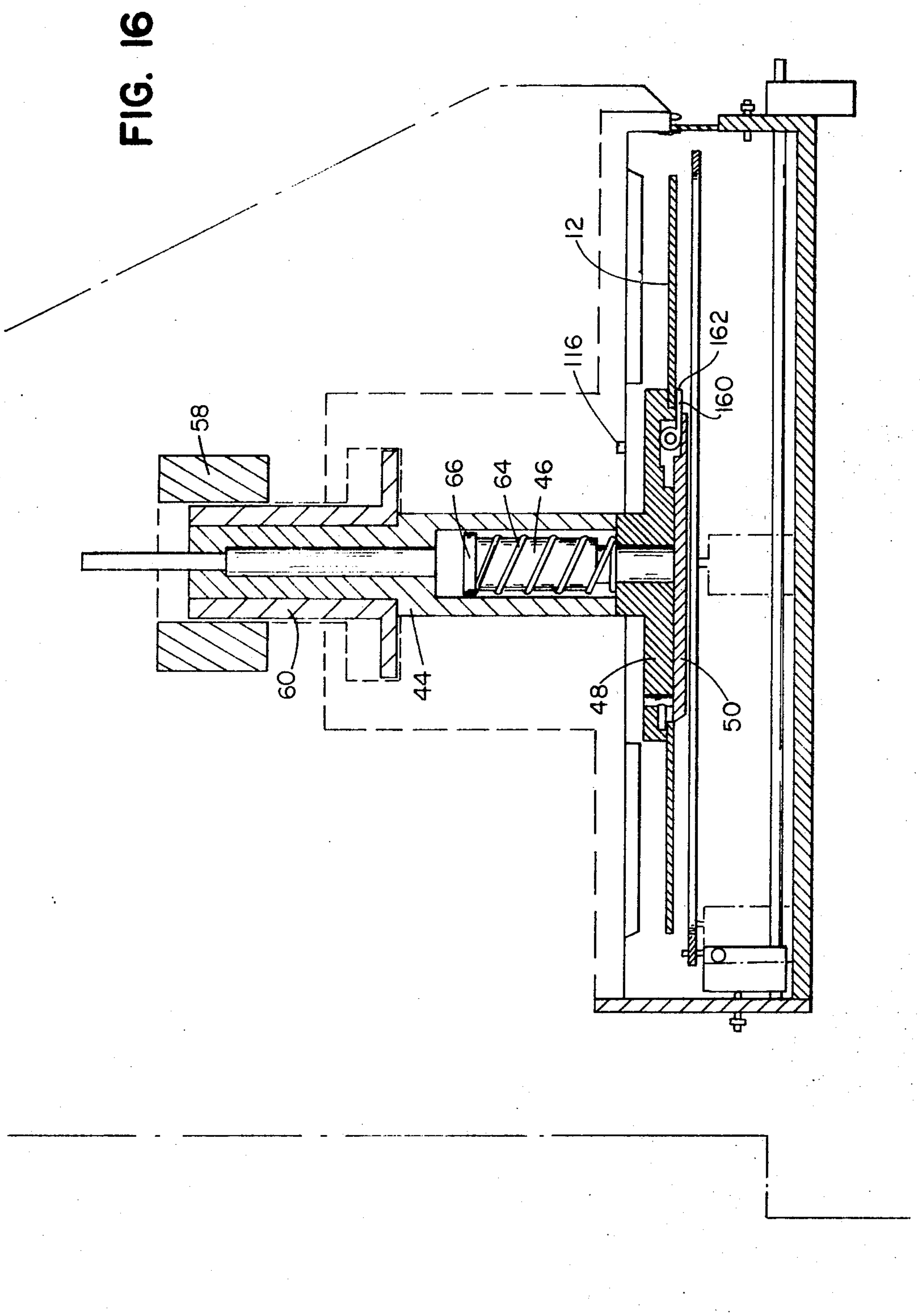
Figure 17:
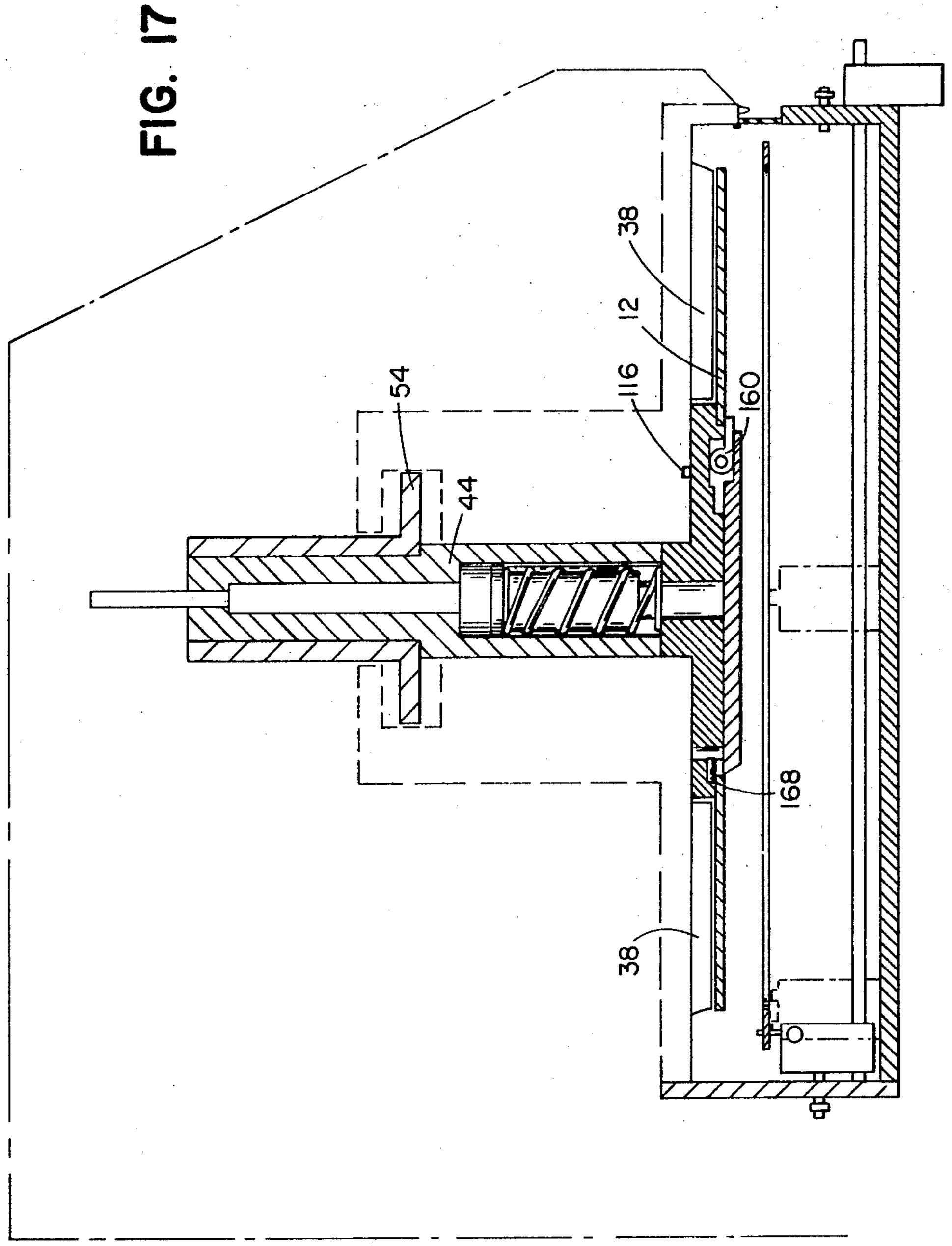

When sensor 116 senses that hub 48 is down, pressure on upper end 66 of spindle 46 is released, allowing spring 64 to raise the spindle, thereby raising plate 50 which closes latch fingers 160, locking disk 12 into place on hub 48 (FIG. 16). At the same time, the motor at 58 and 60 is turned on, rotating hub spindle 44, and with it hub 48 and disk 12. When the motor is sensed by speed sensor 118 to be up to speed (3,600 rpm), referring now to FIG. 17, spindle 44 is raised by air pressure against flange 54, and carries disk 12 into operative position with respect to read/record heads at 38. A thrust air bearing is developed between the rotating disk and the structure carrying the read/record heads, thereby maintaining the disk in precise operative orientation.

After data has been transferred to or from disk 12, the operator commands "Stop" pushing an appropriate control button 24, and in response to this command, spindle 44 is lowered. When hub 48 is sensed by sensor 116 to be down, motor 58 and 60 is turned off and braked. After a delay to allow spindle 44 to cease rotating, air under pressure forces spindle 46 down, releasing latches 160. Disk removal pins 168 assist in removing disk 12 from hub 48, on which it fits tightly. Spindle 46 actuates latch-open sensor 114, in response to which spindle 44 is raised, carrying with it spindle 46 in lowered position, so that latches 160 remain open and pass through the center of disk 12. When spindle 44 raises hub 48, hub-up sensor 116 actuates the control mechanism to remove air pressure from top 66 of spindle 46, allowing it to rise, and plate 50 then closes latches 160.

At this time, by inserting an enclosure into frame 11 and thereby actuating sensor 109, the operator initiates the removal of disk 12 from chamber 28. Transfer carrier 78, with pin 100 still engaging pin hole 23 in transport 18, is moved forward on lead screw 74, and when carrier-forward sensor 82 registers that transfer carrier 78 has reached the front of chamber 28, unlatch piston 106 engages end 96 of cam 84, moving it to the unlatch position and permitting pin 100 to drop and thereby disengage from hole 23. Enclosure 10 is unlocked and may now be removed from frame 11 with transport 18 and disk 12 inside for storage.

What is claimed is:

1. In disk information storage apparatus having axially fixed read/write heads for use with an annular information disk with a central opening disk driving mechanism mounting a disk for rotation closely adjacent said read/write heads, comprising a housing having an end aligning surface adjacent said read/write heads and a central bore perpendicular to said aligning surface, said central bore having an enlarged cylinder portion spaced from said end aligning surface, a driving spindle mounted in said housing bore for rotary and reciprocatory movement therein, said driving spindle having an annular portion overlying said housing end aligning surface providing an air bearing surface cooperating therewith a disk aligning portion for engagement with a disk adjacent its central opening a cylindrical portion cooperating with said central housing bore providing an air bearing surface cooperating therewith, including an enlarged piston portion cooperating with said enlarged housing cylinder portion, motor means for rotating said driving spindle driving spindle power means for reciprocating said driving spindle between an operative position with its annular portion adjacent said housing aligning surface and an inoperative position spaced therefrom, said power means including fluid pressure means connected to said enlarged cylinder bore portion, and air pressure means connected to said housing bore for supplying air thereto to pressurize said air bearing surfaces.

2. In disk information storage apparatus having axially fixed read/write heads for use with an annular information disk with a central opening a disk chucking and driving mechanism removably mounting a disk for rotation closely adjacent said read/write heads, comprising a housing having an end aligning surface adjacent said read/write heads and a central bore perpendicular to said aligning surface, said central bore having an enlarged cylinder portion spaced from said end aligning surface, a driving spindle mounted in said housing bore for rotary and reciprocatory movement therein, said driving spindle having an annular portion overlying said housing end aligning surface providing an air bearing surface cooperating therewith a disk aligning portion for engagement with a disk adjacent its central opening a cylindrical portion cooperating with said central housing bore providing an air bearing surface cooperating therewith, including an enlarged piston portion cooperating with said enlarged housing cylinder portion, a central driving spindle bore motor means for rotating said driving spindle driving spindle power means for reciprocating said driving spindle between an operative position with its annular portion adjacent said housing aligning surface and an inoperative position spaced therefrom, including fluid pressure means connected to said enlarged cylinder bore portion, air pressure means connected to said housing bore for supplying air thereto to pressurize said air bearing surfaces, a chucking spindle mounted in said driving spindle bore for reciprocating movement therein and having retractable disk engaging means mounted thereon at the free end thereof for engaging a disk adjacent its central opening and chucking power means for reciprocating said chucking spindle between an operative position with its disk engaging means engaged with one side of said disk and with the other side of said disk in contact with said driving spindle disk aligning portion, including fluid pressure means connected to said driving spindle bore.

3. A transfer system for automatically extracting an information disk from an enclosure in which said disk is stored when not in use, introducing said disk into a chamber in which said disk will be used, and restoring said disk to said enclosure after use, comprising a disk transport surrounding said disk at its circumference, allowing access to at least one face of said disk, and providing handle means by which said transport may be moved, said handle means remaining at all times exterior to said enclosure;

means for supporting said disk and said transport within said enclosure means for supporting said disk and said transport within said chamber transfer means, movable between two extreme positions, providing releasable attaching means cooperating with said handle means for moving said transport power means for moving said transfer means position sensor means for sensing when said transfer means is in either of said two extreme positions enclosure sensing means for sensing when said enclosure is in operative orientation with respect to said chamber command means for initiating operation of said transfer assembly and control logic means, responsive to said position sensor means, to said enclosure sensing means, and to said command means, for actuating said attaching means and said power means.

* * * * *